Aug. 14, 1934. D. KURKCHEE Re. 19,272

BED

Original Filed March 31, 1932 4 Sheets-Sheet 1

Inventor
David Kurkchee

By Clarence A. O'Brien
Attorney

Aug. 14, 1934. D. KURKCHEE Re. 19,272

BED

Original Filed March 31, 1932 4 Sheets-Sheet 2

Inventor

David Kurkchee

By Clarence A. O'Brien

Attorney

Aug. 14, 1934. D. KURKCHEE Re. 19,272

BED

Original Filed March 31, 1932 4 Sheets-Sheet 3

Inventor
David Kurkchee

By Clarence O'Brien
Attorney

Aug. 14, 1934. D. KURKCHEE Re. 19,272

BED

Original Filed March 31, 1932 4 Sheets-Sheet 4

Inventor

David Kurkchee

By Clarence A. O'Brien

Attorney

Reissued Aug. 14, 1934

Re. 19,272

UNITED STATES PATENT OFFICE 19,272

BED

David Kurkchee, Schenectady, N. Y.

Original No. 1,889,148, dated November 29, 1932, Serial No. 602,333, March 31, 1932. Application for reissue September 8, 1933, Serial No. 688,913

10 Claims. (Cl. 5—183)

This invention relates to improvements in beds, the general object of the invention being to provide a bed which is adjustable as to its width whereby the bed can be used as a single one, a double one or the bed can be adjusted to any width between a single and double bed.

Another object of the invention is to provide graduated means whereby the bed can be adjusted to the exact width desired.

A further object of the invention is to provide means whereby either the foot member or the head member of the bed can be adjusted as to its width by operating a single member.

Another object of the invention is to so construct and arrange the parts that the bed will have the appearance of an ordinary bed as the invention will not detract from the appearance of the bed.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Fig. 17 is a view partly in section showing how the handle is connected to the screw shaft.

Figure 19:
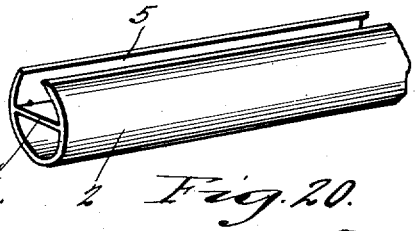
Fig. 19 is a fragmentary perspective view of one of the telescopic members.
Figure 11:
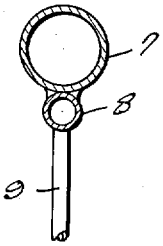
Fig. 11 is a section on line 11—11 of Fig. 14.

In these drawings, the letter A indicates the head member of the head and the letter B the foot member thereof. Each member comprises a pair of vertical members 1, the major portions of which form the posts, with the upper ends of said members curving towards each other to form portions of the top of the member, and a tubular member or extension 2 is suitably fastened in the upper end of one of the members 1 and a member or extension 3 is suitably fastened in the upper end of the other end of the member 1. The member 2 is constructed as shown in Fig. 19 and is provided with a partition 4 and a slot 5 in its top while the member 3 is of semi-circular shape in cross section with its edges connected together by the plate 6.

Figure 6:
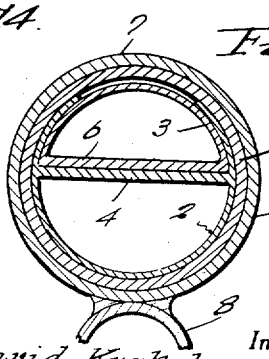
Fig. 6 is a section on line 6—6 of Fig. 1.

As shown more particularly in Fig. 6 the member 3 has a sliding or telescopic fit in the upper part of the member 2 with the part 6 thereof contacting or overlapping the partition 4. A horizontally arranged tubular part or upper guide 7 receives the horizontal portions of the upper ends of the members 1 and the members 2 and 3 and forms a guide for such parts during movement of the parts. This member 7 is attached to a smaller tubular part 8 to which the upper ends of the panels 9 are connected. The lower ends of the panels are connected to the tubular parts 10 which in turn are connected to the tubular parts or lower guide 11 which have their adjacent ends spaced apart to receive the handle 12 attached to the central part of a screw shaft 13 which is formed with right and left threads as shown more particularly in Fig. 17.

Figure 5:
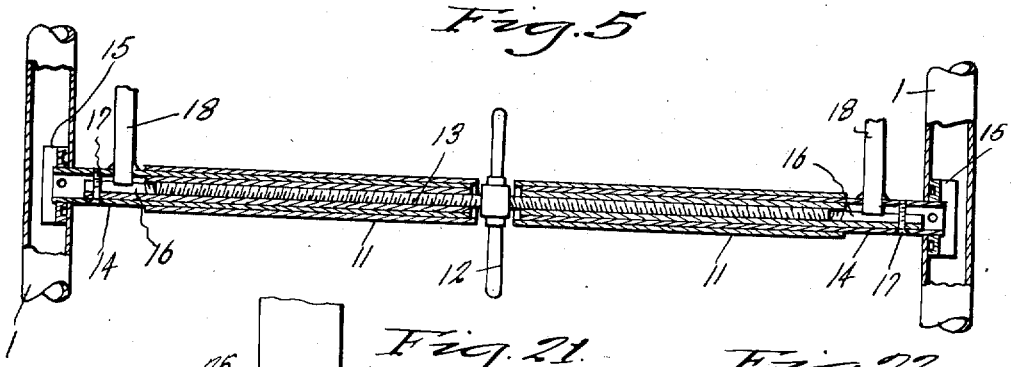
Fig. 5 is a sectional view showing the operating means for adjusting the width of a member.
Figure 21:
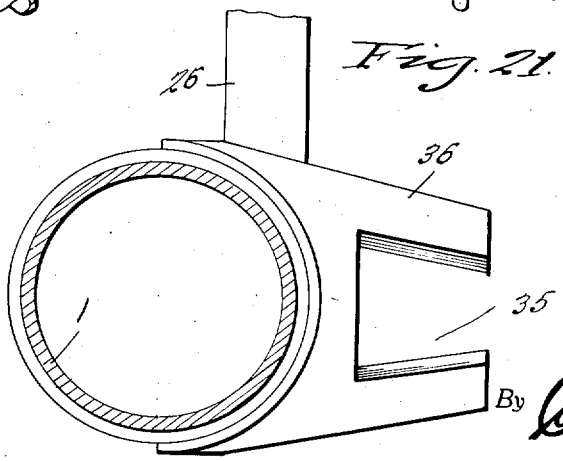
Fig. 21 is a section on line 21—21 of Fig. 15.

Tubular members 14 are attached to intermediate portions of the members 1, such as shown generally at 15 in Fig. 5, and these members 14 extend into members 11 and an internally threaded tubular member 16 is placed in each member 14 and has its outer end cut away as shown in Fig. 5 and said members 14 and 16 are connected together, such as by the screws 17. These members 16 are formed with right and left threads to correspond with the threads on the shaft 13 and of course receive the threaded portions of the shaft so that as the shaft is turned in one direction the members 14 and 16 will cause the post members 1 to move towards each other and when the shaft is turned in the opposite direction, the post members will move away from each other and during these movements, the horizontal upper portions of the post members will move in the stationary tubular member 7 and the members 2 and 3 will have sliding movement relative to each other, and as the member 7 and the members 11 are connected together by the panels forming a rigid central section, said parts form a stationary structure of considerable strength to which the other parts are slidably connected whereby said parts when operated by the screw shaft will move freely without binding and but little effort is required to turn the shaft to move the parts to adjust the width of the bed members.

Figure 1:
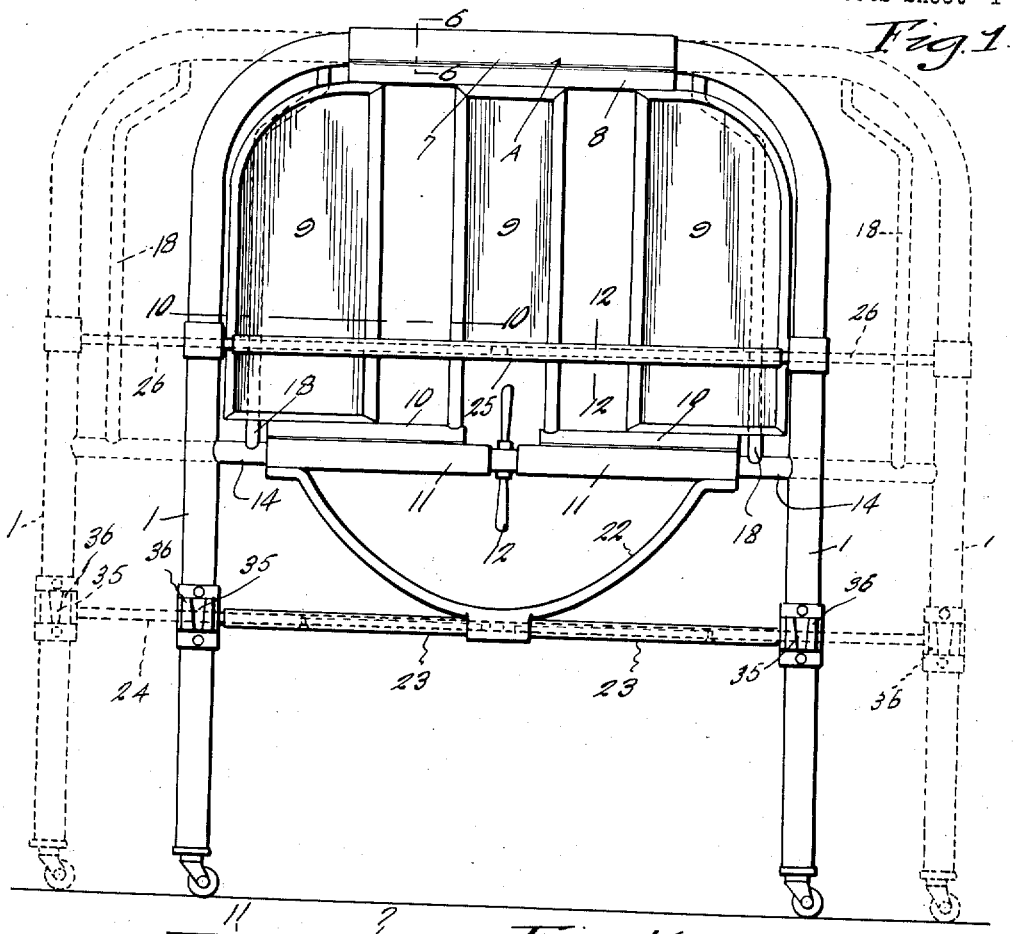
Figure 1 is a view of the head member of the bed, this view showing the member extended, in dotted lines.
Figure 14:
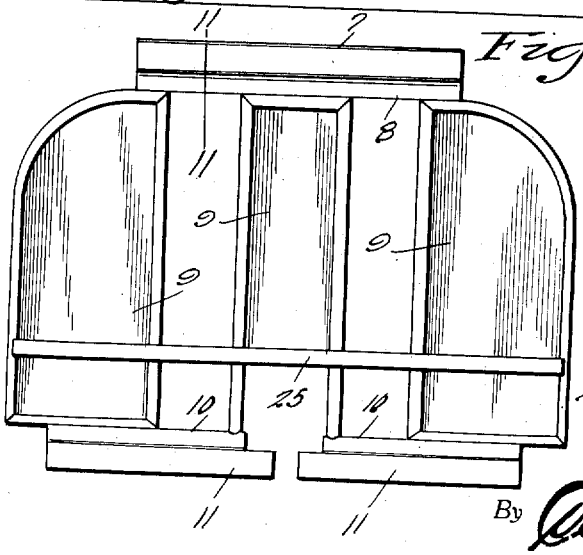
Fig. 14 is a view of one of the panel assemblies.
Figure 2:
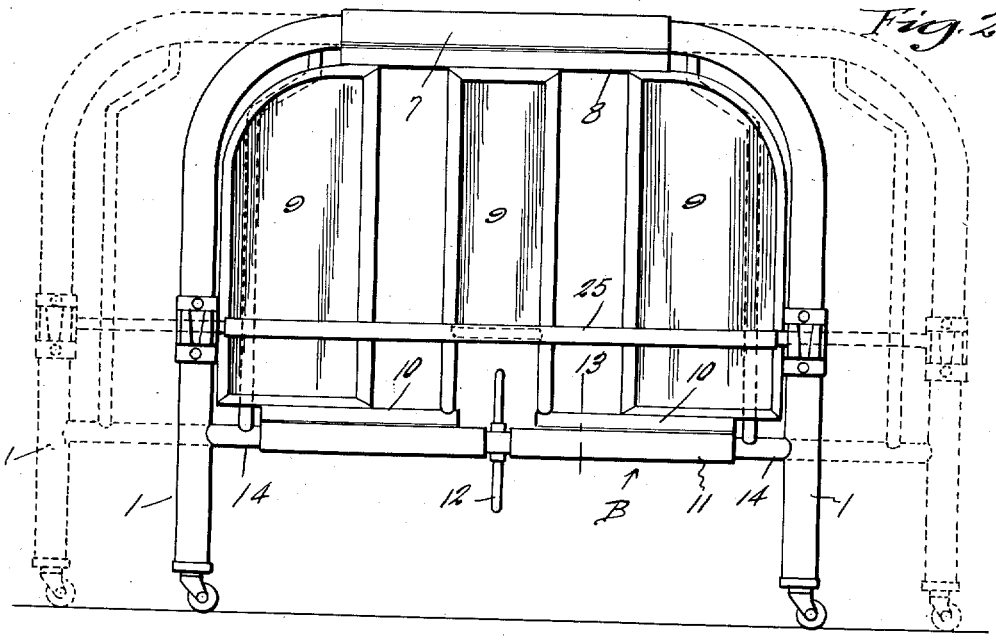
Fig. 2 is a similar view of the foot member of the bed.
Figure 15:
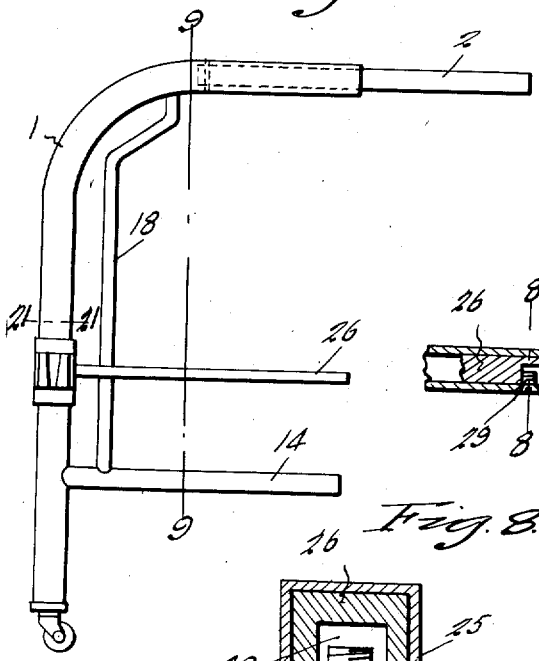
Fig. 15 is a view of an end section of one of the members.
Figure 16:
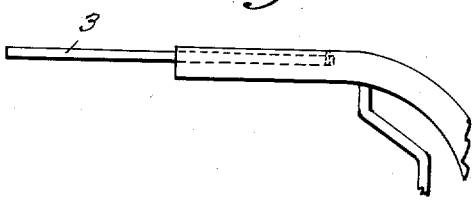
Fig. 16 is a fragmentary view of the other section.
Figure 7:
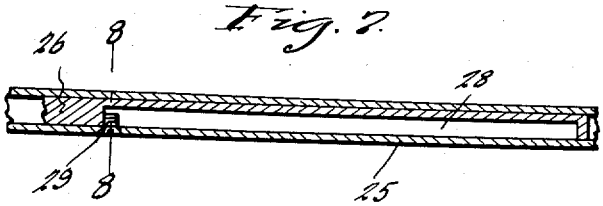
Fig. 7 is a detail sectional view showing the means for limiting the movement of one of the graduated members.
Figure 8:
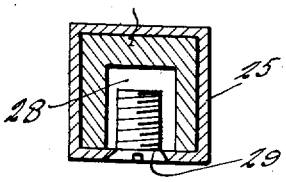
Fig. 8 is a section on line 8—8 of Fig. 7.
Figure 3:
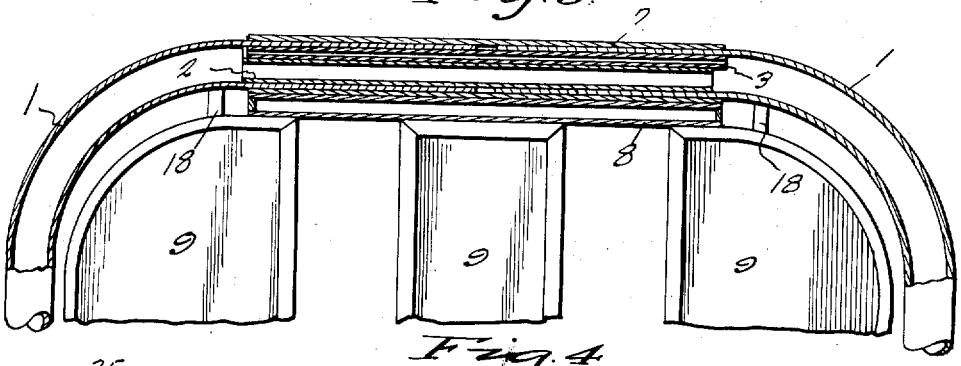
Fig. 3 is a fragmentary view partly in section of one of the members.
Figure 4:
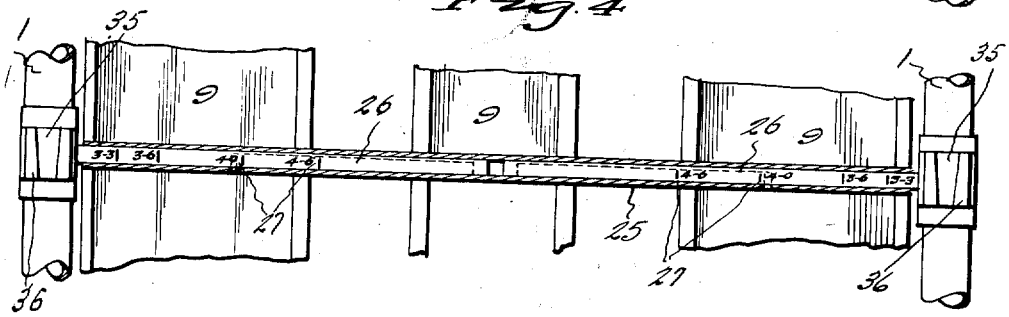
Fig. 4 is a fragmentary view of the foot member with parts in section to show the graduated members.
Figure 9:
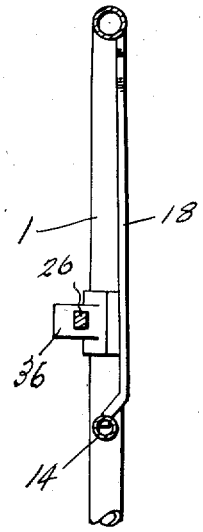
Fig. 9 is a section on line 9—9 of Fig. 15.
Figure 10:
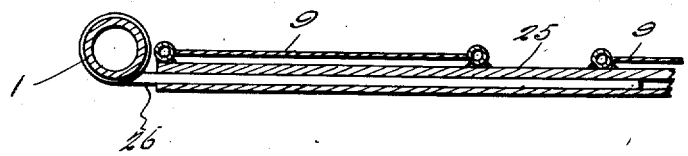
Fig. 10 is a section on line 10—10 of Fig. 1.
Figure 12:
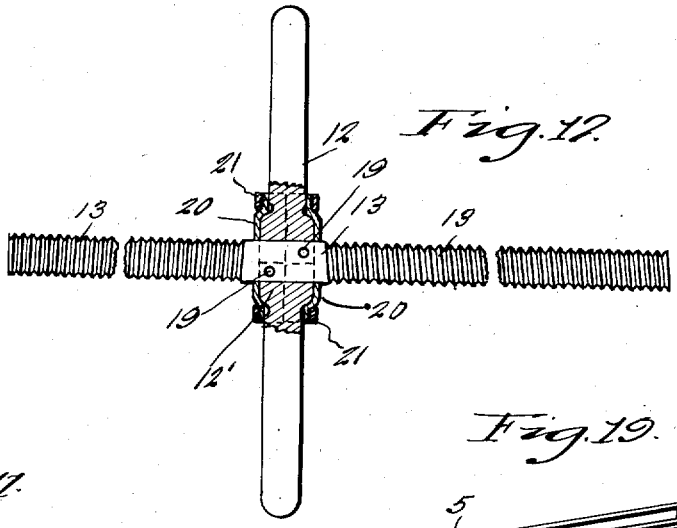
Fig. 12 is a section on line 12—12 of Fig. 1.

A brace member 18 connects each of the members 14 with the upper part of each of the post members 1 and this brace member 18 has its major part offset, as shown more particularly in Fig. 9 so that it will be out of the way of the panel assembly when the bed member is contracted as shown in Figs. 1 and 2.

Each brace member 18 extends through a hole in the upper part of a member 14 and by cutting away the outer end of the tubular part 16, this part or member 16 can be withdrawn, by removing the screw 17, whenever desired or necessary without interference from the brace member.

Figure 18:
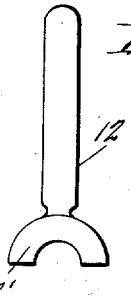
Fig. 18 is a view of one section of the handle.
Figure 20:
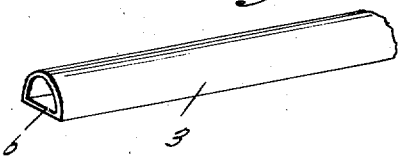
Fig. 20 is a similar view of the opposite member.
Figure 12:
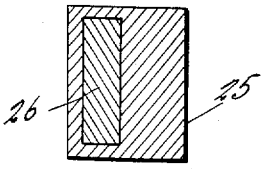
Figure 13:
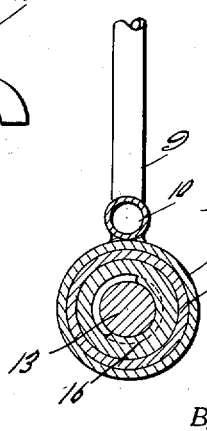
Fig. 13 is a section on line 13—13 of Fig. 2.

I prefer to form the handle 12 of two sections, one of which is shown in Fig. 18, each section having a semi-circular hub part 12'. These hub parts will encircle the central part of the shaft when the two sections are placed together, as shown in Fig. 17, and these hub sections are fastened to the shaft by pins or screws 19. The hub sections are covered by a sectional casing 20, the two sections of which are held in position by the rings 21 threaded to the circular portions formed at the ends of the casing as shown in Fig. 17.

As shown in Fig. 1, the head member of the bed is provided with an arcuate brace member 22 which has the upper ends of its limbs connected to the outer ends of the members 11 with its lower part supporting the tubular members 23 in which slide the rods 24 attached to lower parts of the leg or post members 1, these parts acting to brace the head member and increasing the freedom of movement of the movable parts.

In order to facilitate adjustment of the foot and head members to exact widths, I provide scale means which includes a bar 25 rigidly attached to each panel assembly and having a non-circular passage therethrough for receiving the graduated bars 26 attached to the post members 1. Thus by watching the graduations 27 of these bars 26, as the parts are being adjusted, the bed can be adjusted to an exact width.

As will be seen, the ends of the bar 25 act as markers for the graduations on the bars 26. Each bar 26 is provided with a groove 28 for receiving a screw 29 carried by the bar 25, so that these screws engaging the ends of the slots or grooves act as stop means for limiting the movement of the parts.

The drawings show the stop means associated with the parts 23 and 24 of the head member A and such stop means associated with the scale means of the foot member B but it will of course be understood that such stop means can be located where most convenient.

Figure 22:
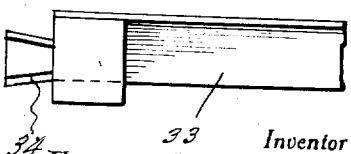
Fig. 22 is a view of an end part of one of the side rails.

As shown in Fig. 1, the scale means are so arranged on the head member A that they can readily be observed above the pillows when the bed is made up. The side rails, one of which is shown at 30 in Fig. 22, each has a dove-tailed shaped part 34 at each end thereof for fitting in a dove-tail shaped socket 35 in a bracket 36 one of which is attached to each leg forming portion of the foot and head members.

From the foregoing it will be seen that I have provided a bed of the maximum strength and of attractive appearance which can be adjusted as to its width to provide a single bed, a double ed, or any width bed intermediate a single and double bed width.

It is also to be seen that it is simply necessary to turn a single screw shaft on each of the foot and head members of the bed in order to make the adjustments and due to the right and left threaded portions the adjustments can be easily and quickly made and due to the construction and arrangement of the parts, there is no danger of the parts binding during the adjustment movement.

It will also be seen that the bed has practically the same appearance as an ordinary bed as the invention does not detract from the appearance of the bed.

The scale means permits the bed to be adjusted to exact widths so that the springs will fit the bed, after the bed has been adjusted for use with a certain size spring.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. In a bed of the class described, head and foot members each comprising a central section having a horizontally arranged tubular part at its upper end and a pair of aligned tubular parts at its lower portion, said pair of alined tubular parts being spaced apart, a pair of post members, a tubular part connected to the upper end of one post member and extending into the upper tubular part and having a horizontal partition therein, a horizontal member connected to the upper end of the other post member and having a flat lower part, the said horizontal member having sliding movement in the member provided with the partition with its flat lower part resting on the partition, said horizontal member also extending into the upper tubular member of the central section, a screw shaft provided with right and left threaded portions located in the pair of lower tubular parts of the central section, a handle attached to the central part of the shaft and located in the space between the inner ends of the lower tubular part, and an inwardly extending horizontally arranged tubular part connected at its outer end with each post member and at an intermediate portion of said post member, and extending into a tubular part at the lower portion of the central section and internally threaded to receive a threaded portion of the shaft.

2. In a bed of the class described, head and foot members each comprising a central section having a tubular part horizontally arranged at its upper end, and a pair of aligned horizontal tubular parts at its lower portion, the latter tubular parts being spaced apart, a pair of post members each having its upped end curving inwardly and terminating in a horizontal part, a tubular part having a horizontal partition therein connected to the extremity of one post member, a horizontal member having a flat lower part, connected to the horizontal extremity of the other post, and its flat part resting on the partition, the horizontal portions of the post members and the two parts attached thereto sliding in the tubular part at the upper end of the central section, a screw shaft provided with right and left threads extending into the pair of tubular parts, a handle attached to the central part of the shaft and located between the inner ends of the pair of tubular parts, horizontally arranged inwardly extending members having their outer ends connected with intermediate portion of the post members, and extending into the pair of tubular parts, an internally threaded tubular member located in and attached to each of the inwardly extending members and receiving a threaded part of the shaft.

3. In a bed of the class described, head and foot members each comprising a central section having a tubular part horizontally arranged at its upper end, and a pair of aligned horizontal tubular parts at its lower portion, the latter tubular parts being spaced apart, a pair of post members each having its upper end curving inwardly and terminating in a horizontal part, a tubular part having a horizontal partition therein connected to the extremity of one post member, a horizontal member having a flat lower part, connected to the horizontal extremity of the other post, and its flat part resting on the partition, the horizontal portions of the post members and the two parts attached thereto sliding in the tubular part of the upper end of the central section, a screw shaft provided with right and left threads extending into the pair of tubular parts, a handle attached to the central part of the shaft and located between the inner ends of the pair of tubular parts, horizontally arranged inwardly extending members having their outer ends connected with intermediate portions of the post members, and extending into the pair of tubular parts, an internally threaded tubular member located in and attached to each of the inwardly extending members and receiving a threaded part of the shaft, a scale section horizontally arranged and rigidly attached to the central section and of non-circular shape in cross section and of tubular construction, and a graduated bar having its outer end attached to an intermediate part of each post member and of the same cross sectional shape as the scale part having sliding movement in said scale part.

4. In a bed of the class described, head and foot members each comprising a central section having a tubular part horizontally arranged at its upper end, and a pair of aligned horizontal tubular parts at its lower portion, the latter tubular parts being spaced apart, a pair of post members each having its upper end curving inwardly and terminating in a horizontal part, a tubular part having a horizontal partition therein connected to the extremity of one post member, a horizontal member having a flat lower part, connected to the horizontal extremity of the other post, and its flat part resting on the partition, the horizontal portions of the post members and the two parts attached thereto sliding in the tubular part of the upper end of the central section, a screw shaft provided with right and left threads extending into the pair of tubular parts, a handle attached to the central part of the shaft and located between the inner ends of the pair of tubular parts, horizontally arranged inwardly extending members having their outer ends connected with intermediate portions of the post members, and extending into the pair of tubular parts, an internally threaded tubular member located in and attached to each of the inwardly extending members and receiving a threaded part of the shaft, a scale section horizontally arranged and rigidly attached to the central section and of non-circular shape in cross section and of tubular construction, and a graduated bar having its outer ends attached to an intermediate part of each post member and of the same cross sectional shape as the scale part having sliding movement in said scale part, the scale parts of the head section being located above the parts of said head section covered by the pillows.

5. In a bed of the class described, head and foot members each comprising a central section having a tubular part horizontally arranged at its upper end, and a pair of aligned horizontal tubular parts at its lower portion, the latter tubular parts being spaced apart, a pair of post members each having its upper end curving inwardly and terminating in a horizontal part, a tubular part having a horizontal partition therein connected to the extremity of the one post member, a horizontal member having a flat lower part, connected to the horizontal extremity of the other post, and its flat part resting on the partition, the horizontal portions of the post members and the two parts attached thereto sliding in the tubular part of the upper end of the central section, a screw shaft provided with right and left threads extending into the pair of tubular parts, a handle attached to the central part of the shaft and located between the inner ends of the pair of tubular parts, horizontally arranged inwardly extending members having their outer ends connected with intermediate portions of the post members, and extending into the pair of tubular parts, an internally threaded tubular member located in and attached to each of the inwardly extending members and receiving a threaded part of the shaft, a scale section horizontally arranged and rigidly attached to the central section and of non-circular shape in cross section and of tubular construction, and a graduated bar having its outer end attached to an intermediate part of each post member and of the same cross sectional shape as the scale part having sliding movement in said scale part, the scale parts of the head section being located above the parts of said head section covered by the pillows, and said head member having a bowed member having its ends attached to the outer ends of the pair of tubular parts, and a second pair of tubular parts having their inner ends connected to the lower central portion of the bowed member, bars sliding in the second pair of tubular parts and having their outer ends connected with the leg members, each bar having a groove therein terminating short of the ends of the bar, and projections carried by the second pairs of tubular parts and extending into the grooves for limiting the outward movement of the leg members.

6. In a bed of the class described, head and foot numbers each comprising a central section having a tubular part horizontally arranged at its upper end, and a pair of aligned horizontal tubular parts at its lower portion, the latter tubular parts being spaced apart, a pair of post members each member having its upper end curving inwardly and terminating in a horizontal part, a tubular part having a horizontal partition therein connected to the extremity of the one post member, a horizontal member having a flat lower part, connected to the horizontal extremity of the other post, and its flat part resting on the partition, the horizontal portions of the post members and the two parts attached thereto sliding in the tubular part at the upper end of the central section, a screw shaft provided with right and left threads extending into the pair of tubular parts, a handle attached to the central part of the shaft and located between the inner ends of the pair of tubular parts, horizontally arranged inwardly extending members having their outer ends connected with intermediate portions of the post members, and extending into the pair of tubular parts, an internally threaded tubular member located in and attached to each of the inwardly extending members and receiving a threaded part of the shaft, a scale section horizontally arranged and rigidly attached to the central section and of non-circular shape in cross section and of tubular construction, and a graduated bar having its outer end attached to an intermediate part of each post member and of the same cross sectional shape as the scale part having sliding movement in said scale part, the scale parts of the head section being located above the parts of said head section covered by the pillows, said head member having a bowed member having its ends attached to the outer ends of the pair of tubular parts, and a second pair of tubular parts having their inner ends connected to the lower central portion of the bowed member, bars sliding in the second pair of tubular parts and having their outer ends connected with the leg members, each bar having a groove therein terminating short of the ends of the bar, projections carried by the second pairs of tubular parts and extending into the grooves for limiting the outward movement of the leg members, the graduated bars of the foot member having grooves therein, and the scale part for receiving said bars having projections thereon extending into the grooves.

7. In a bed of the class described, head and foot members each provided with a central portion, having a horizontally arranged tubular part on its upper end and a pair of aligned horizontal tubular portions at its lower part, the latter tubular portions being spaced apart, a screw shaft provided with right and left threads located in the latter portions, a handle connected with the central portion of the shaft and located in the space between the inner ends of the pair of tubular parts, a pair of leg members having horizontal portions at their upper ends extending into the upper horizontal part with the upper end portions of one leg member telescoping into the upper end portions of the other leg member, inwardly extending horizontally arranged tubular members having their outer ends connected to intermediate portions of the leg members and extending into the pair of horizontal tubular parts of the central section, internally threaded tubular portions located in and attached to the last-mentioned tubular members and receiving the threaded portions of the shaft, and a vertically arranged brace member having its lower end connected to an outer part of each inwardly extending tubular member and its upper end connected to a portion of the horizontal part of each leg member.

8. In a bed of the class described, a head or foot member including a rigid central section provided with a guide at the upper and lower portion thereof, a vertically arranged supporting post at each end of said central section, each of said posts being curved to extend horizontally and arranged in said upper guide, a slidable connection between said posts arranged below said central section, means carried by said central section and connected to said slidable connection for reinforcing said slidable connection, and means carried by said lower guide for adjusting said posts with respect to said central section to vary the width of the bed.

9. In a bed of the class described, a head or foot member comprising a central section having a horizontally arranged tubular part at its upper portion and a pair of aligned tubular parts at its lower portion, said pair of aligned tubular parts being spaced apart, a pair of post members, a tubular part extending from the upper end of each of said post members and extending into the upper tubular part of said central section, and means including an adjusting handle arranged between the adjacent ends of said aligned tubular parts and adjusting means arranged in said tubular parts for adjusting the width of the bed.

10. In a bed of the class described, a head or foot member comprising a central section having a horizontally arranged tubular part at its upper portion and a pair of aligned tubular parts at its lower portion, said pair of aligned tubular parts being spaced apart, a pair of post members, a tubular part extending from the upper end of each of said post members and extending into the upper tubular part of said central section, and means including an adjusting shaft extending through said aligned tubular portions of said central section for connecting said post members and for adjusting the width of the bed, said means including an adjusting handle arranged between the adjacent ends of said aligned tubular parts.

DAVID KURKCHEE.